United States Patent [19]

Fergason

[11] Patent Number: 4,884,877
[45] Date of Patent: * Dec. 5, 1989

[54] LIQUID CRYSTAL TEMPERATURE SENSOR AND MATERIALS UTILIZING MICROENCAPSULATED LIQUID CRYSTAL

[75] Inventor: James L. Fergason, Atherton, Calif.

[73] Assignee: Manchester R & D Partnership, Pepper Pike, Ohio

[*] Notice: The portion of the term of this patent subsequent to Mar. 6, 2001 has been disclaimed.

[21] Appl. No.: 829,652

[22] PCT Filed: May 21, 1985

[86] PCT No.: PCT/US85/00953
§ 371 Date: Jan. 22, 1986
§ 102(e) Date: Jan. 22, 1986

[87] PCT Pub. No.: WO85/05467
PCT Pub. Date: Dec. 5, 1985

Related U.S. Application Data

[63] Continuation-in-part of Ser. No. 612,906, May 22, 1984, abandoned.

[51] Int. Cl.$^4$ .............................................. G02F 1/13
[52] U.S. Cl. .................................. 350/351; 350/334; 350/347 V; 350/330; 428/1; 252/299.64; 252/299.67
[58] Field of Search ............... 350/331 R, 334, 350 R, 350/347 V, 351, 330; 252/316; 428/1

[56] References Cited

U.S. PATENT DOCUMENTS

| | | | |
|---|---|---|---|
| 3,529,156 | 9/1970 | Fergason et al. | 350/351 X |
| 3,565,818 | 2/1971 | Bayless et al. | 252/316 |
| 3,585,381 | 6/1971 | Hodson et al. | 350/351 X |
| 3,600,060 | 8/1971 | Churchill et al. | 350/351 X |
| 3,661,142 | 5/1972 | Flam | 428/1 X |
| 3,703,331 | 11/1972 | Goldmacher et al. | 350/350 R X |
| 3,720,623 | 3/1973 | Cartmell et al. | 252/316 |
| 3,734,598 | 5/1973 | Aiken | 350/338 |

(List continued on next page.)

FOREIGN PATENT DOCUMENTS 49-37884 4/1974 Japan.

OTHER PUBLICATIONS

Gray et al., *Electronics Letters*, vol. 9, No. 26, pp. 616-617, Dec. 27, 1973.
Generalova, E. V. et al., "Pseudocapsulated Polymer Felms with Nematic Liquid Crystals".

Primary Examiner—Stanley D. Miller
Assistant Examiner—Richard Gallivan
Attorney, Agent, or Firm—Renner, Otto, Boisselle & Sklar

[57] ABSTRACT

The present invention relates to liquid crystal temperature indicating compositions, preferably absent cholesteric liquid crystal material, and the containing of such compositions in volumes formed in a containment medium that tends to distort the liquid crystal structure when the temperature thereof is below a transition or clearing point temperature. The containment medium is water resistant, e.g. insoluble in water, and preferably has heat and optical stability, e.g. does not brown or otherwise discolor, at relatively high temperatures, e.g. above 100° C. Plural liquid crystal materials having different transition temperatures may be mixed to form a liquid crystal material having a transition temperature intermediate those of the ingredients. In such distorted or curvilinearly aligned mesomorphic phase, the index of refraction of the liquid crystal is different, preferably greater, than that of the containment medium; therefore, incident light will be scattered, preferably isotropically, and such scattered light can be used as a temperature identifier. However, above a transition temperature, the liquid crystal material changes to an isotropic phase, which is substantially optically transparent, on the one hand; and the liquid crystal is so selected such that in the isotropic phase it has an index of refraction substantially matching that of the containment medium. Incident light is transmitted by the isotropic liquid crystal and, accordingly, provides another temperature identifier. The scattering liquid crystal material will appear visually brighter than the transmitting liquid crystal material.

31 Claims, 3 Drawing Sheets

U.S. PATENT DOCUMENTS

| | | | |
|---|---|---|---|
| 3,851,318 | 11/1974 | Taylor et al. | 355/110 |
| 3,876,286 | 4/1975 | Deutscher et al. | 350/350 R |
| 3,947,375 | 3/1976 | Gray et al. | 350/350 R X |
| 3,969,264 | 7/1976 | Davis | 350/351 X |
| 4,001,137 | 11/1977 | Steinstrasser | 252/299.64 |
| 4,005,928 | 2/1977 | Kmetz et al. | 350/331 R X |
| 4,016,098 | 4/1977 | Salki et al. | 252/316 |
| 4,045,383 | 8/1977 | Koff | 260/8 |
| 4,048,358 | 9/1977 | Shanks | 350/351 X |
| 4,070,912 | 1/1978 | McNaughton et al. | 73/356 |
| 4,077,260 | 3/1978 | Gray et al. | 350/350 R X |
| 4,101,207 | 7/1978 | Taylor | 350/344 |
| 4,140,016 | 2/1979 | Fergason | 350/351 X |
| 4,182,700 | 1/1980 | Benton et al. | 260/37 N |
| 4,279,152 | 7/1981 | Crossland | 350/351 X |
| 4,279,770 | 7/1981 | Inukai et al. | 350/350 R X |
| 4,288,822 | 9/1981 | Hareng et al. | 350/330 X |
| 4,301,054 | 11/1981 | Buirley et al. | 260/29.4 UA |
| 4,408,358 | 9/1983 | Shanks | 350/351 X |
| 4,435,047 | 3/1984 | Fergason | 350/334 |

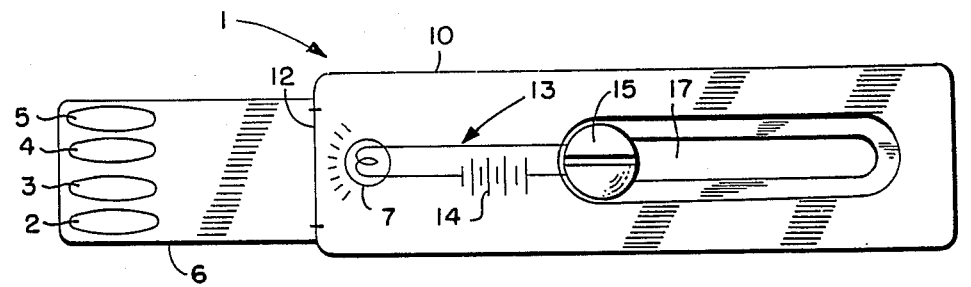
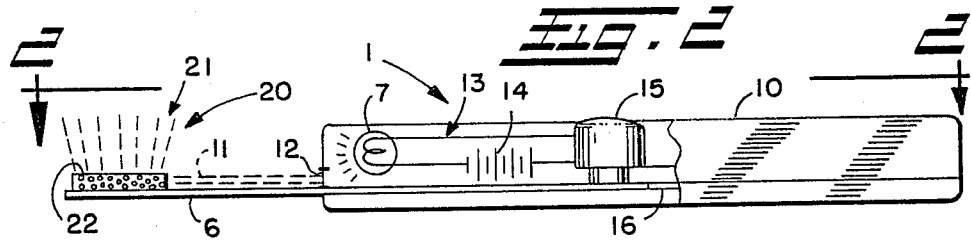
FIG. 1  COOL/SCATTER/BRIGHT
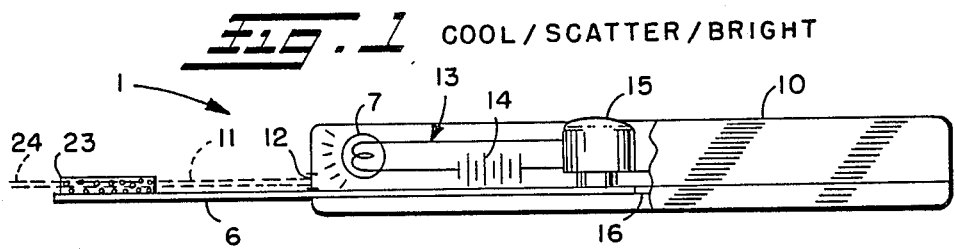
FIG. 3  HOT/TRANSMIT/DARK
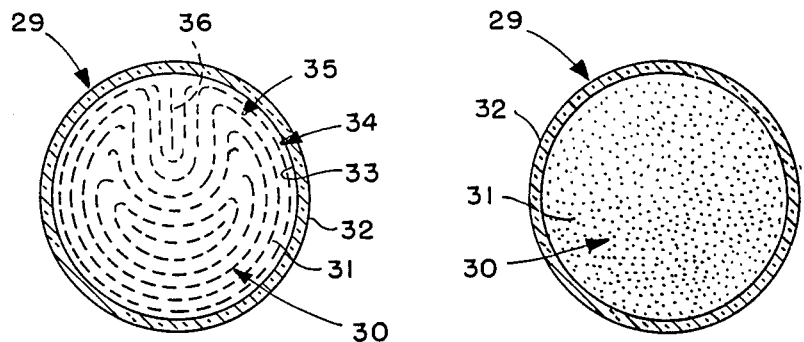
FIG. 4             FIG. 5

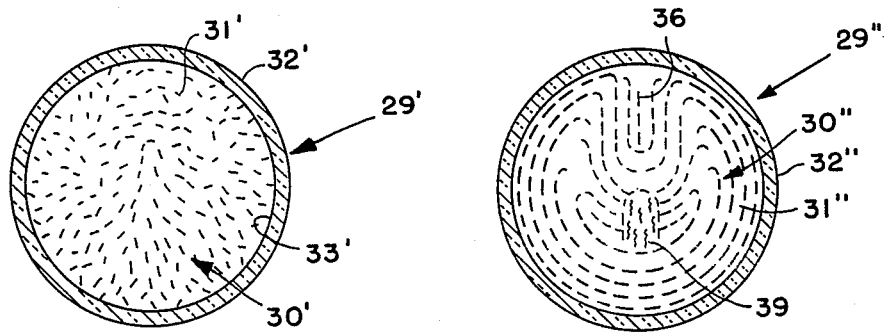
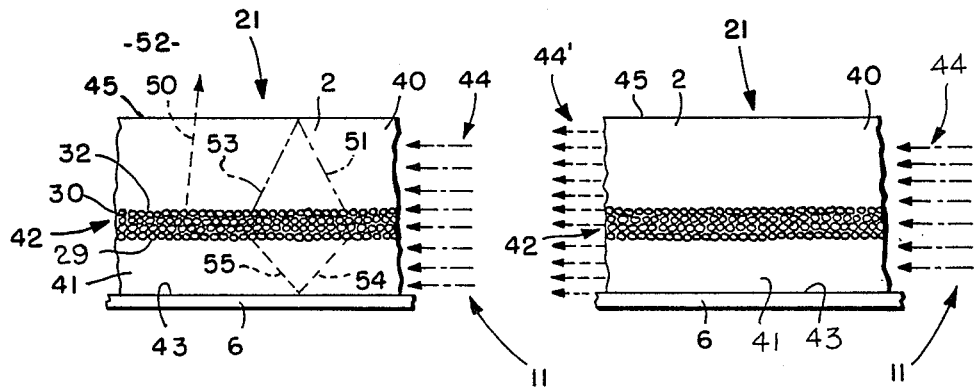

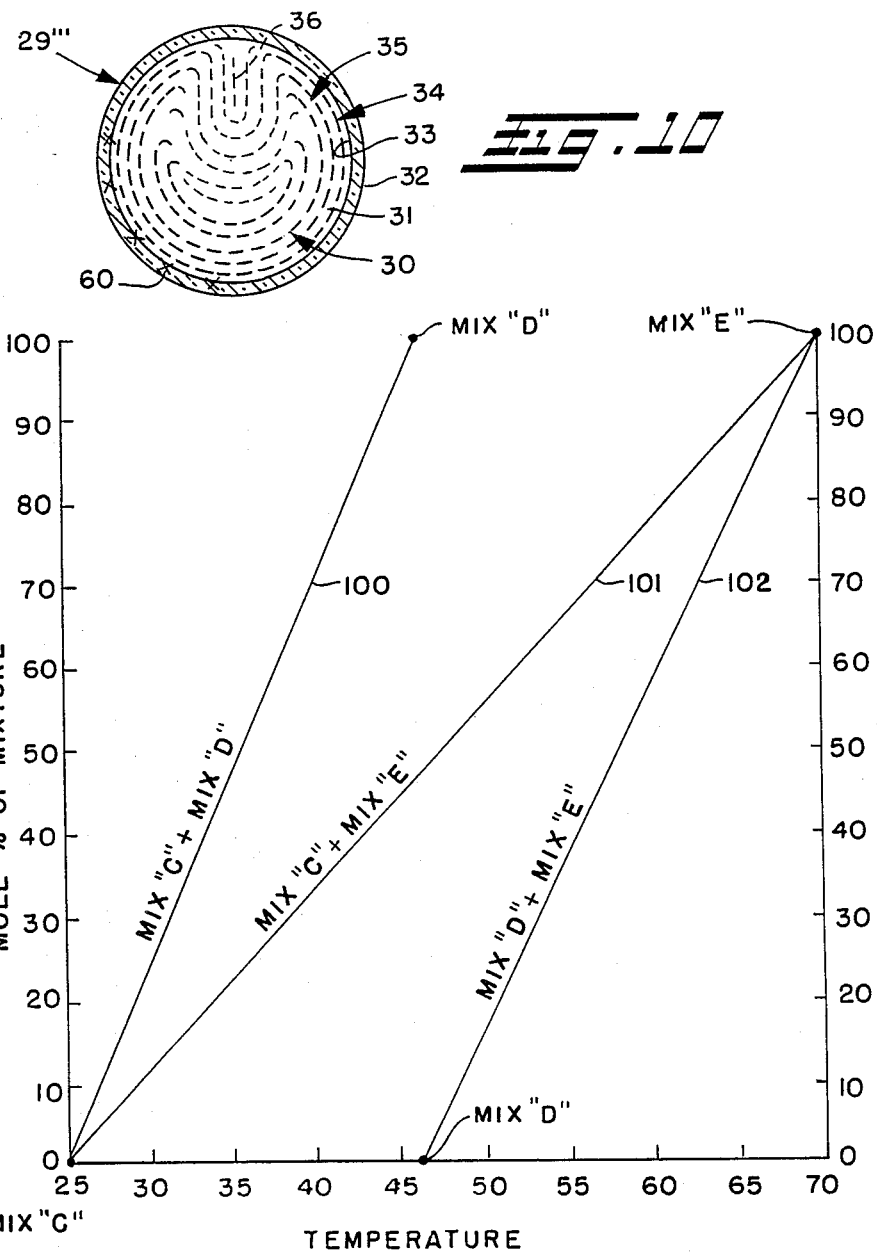

LIQUID CRYSTAL TEMPERATURE SENSOR AND MATERIALS UTILIZING MICROENCAPSULATED LIQUID CRYSTAL

This is a continuation-in-part of copending U.S. Pat. application Ser. No. 612,906, filed May, 22, 1984, abandoned, the entire disclosure of which hereby is incorporated by reference.

TECHNICAL FIELD

The present invention relates generally, as indicated, to liquid crystal devices for sensing temperature, to compositions of liquid crystal material and of containment media and to methods of making and using such liquid crystal material and media. The invention relates to temperature sensing and to thermometric uses of liquid crystal.

CROSS-REFERENCE TO RELATED PATENTS AND APPLICATIONS

U.S. Pat. No. 4,435,047, issued Mar. 6, 1984.

U.S. patent applications Ser. No. 477,138 and Ser. No. 477,242, both filed Mar. 21, 1983, now U.S. Pat. Nos. 4,606,611 and 4,616,903, respectively.

U.S. patent applications Ser. No. 480,461 and Ser. No. 480,466, both filed Mar. 30, 1983, now U.S. Pat. Nos. 4,662,720 and 4,596,445, respectively.

U.S. patent application Ser. No. 585,883, filed Mar. 2, 1984, now U.S. Pat. No. 4,707,080.

The inventor of the instant application also is the inventor in the above patent and applications. The disclosures of such patents and applications hereby are incorporated in their entireties by reference thereto.

BACKGROUND

Liquid crystal materials have been used in the past for temperature sensing purposes. An example of one liquid crystal temperature sensor is disclosed in U.S. Pat. No. 4,140,016. In that patent the temperature sensor employs nematic liquid crystal with an optically active ingredient to cause the nematic liquid crystal to twist so that light ordinarily would be reflected by the liquid crystal material when the temperature thereof is below a so-called transition point temperature or clearing point temperature (the same being used interchangeably herein), whereby the liquid crystal material is in a mesomorphic phase. However, on reaching and exceeding the transition or clearing point temperature, the liquid crystal enters an isotropic phase and becomes substantially optically transparent. The transition temperature can be selected as a function of the ingredients and proportions thereof which are employed to formulate the liquid crystal material. One disadvantage encountered with prior liquid crystal temperature sensors has been the difficulty in reading the same due to inadequate lighting.

Other prior liquid crystal temperature sensor devices have used cholesteric liquid crystal material which ordinarily undergoes a change in apparent color as a function of temperature. One disadvantage frequently encountered with cholesteric temperature sensing devices is the relatively slow reversing, indeed sometimes the non-reversible nature, of the material, for cholesteric liquid crystal frequently is known to have a relatively long relaxation and/or memory characteristic. Another disadvantage with cholesteric liquid crystal temperature sensors is the relatively low temperature maximum of, say, on the order of 100° C. to which the same would be operatively responsive.

The encapsulation or otherwise containment of liquid crystal material, particularly operationally nematic liquid crystal material, in volumes formed in a containment, encapsulating or support medium, is disclosed in the above referenced patent and applications. Moreover, the liquid crystal material and containment medium therein disclosed cooperate such that in the absence of a prescribed input the containment medium tends to distort the natural liquid crystal structure to a so-called curvilinear or distorted alignment. The extraordinary index of refraction of the liquid crystal material, which occurs in the absence of such input, is greater than the index of refraction of the containment medium; and, therefore, incident light impinging on the contained liquid crystal material will tend to be scattered preferably substantially isotropically. However, in the presence of a prescribed input, such as an electric field, the liquid crystal structure tends to align with respect to such input; the ordinary index of refraction of the liquid crystal material preferably is fairly closely matched to that of the containment medium; and, accordingly, the account of scattering (or absorption) of the incident light is reduced. Also disclosed in application Ser. No. 477,138, is a reflector arrangement which reflects a fairly large amount of the isotropically scattered light back to the liquid crystal material for further isotropic scattering thereby. Such reflection increases or enhances the effective brightness of the scattering contained liquid crystal material. The principle of total internal reflection can be relied on to achieve such reflection characteristic and, thus, the desired enhanced brightening.

A possible disadvantage of various media that have been used to encapsulate or to contain liquid crystal material is that such media may encounter substantial and/or relatively rapid discoloring, e.g. browning, when subjected to relatively high temperatures. Another possible disadvantage is that at relatively high temperatures the liquid crystal may dissolve into the medium.

Representative objects of the invention are to provide a liquid crystal temperature sensor that has a wide range of temperature responses, is capable of having high temperature response in particular, rapidly responds to temperature, has a sharp transition between mesomorphic and isotropic phases, is relatively promptly reversible, has the ability to be formulated to provide relatively widely different transition temperatures, and is relatively long lasting; and as to the containment medium, in particular, which contains plural volumes of liquid crystal, does not encounter discoloring or at least rapid discoloring of the containment medium and does not find the liquid crystal dissolving therein. Other objects are to provide improved liquid crystal materials, containment media, methods and techniques for sensing and indicating temperature as well as methods and techniques for formulating such liquid crystal material and devices employing the same.

BRIEF SUMMARY OF THE INVENTION

Briefly, the present invention relates to temperature indicating compositions, devices and methods. Several important aspects of the invention include a discovery of how to use liquid crystal materials for temperature sensing without requiring a cholesteric liquid crystal admixture, of improved liquid crystal materials and methods of making and using same, of the ability to mix liquid crystal materials to obtain a composition having a transition temperature that is a function of the transition points of the ingredients and the proportional quantities of the ingredients, of improved non-discoloring or slow discoloring containment media for holding volumes of liquid crystal material for temperature sensing, and of the containing of such liquid crystal compositions in volumes formed in a containment medium that tends to distort the liquid crystal structure when the temperature thereof is below a transition or clearing point temperature.

While the liquid crystal material is in such distorted or curvilinearly aligned mesomorphic phase, the index of refraction thereof is different, preferably is greater, than the index of refraction of the containment medium. However, if the temperature of the liquid crystal material exceeds a transition temperature, the liquid crystal material changes to an isotropic phase, which is substantially optically transparent, on the one hand, and the liquid crystal, then, is so selected as to have an index of refraction that substantially matches the index of refraction of the containment medium. Therefore, when the liquid crystal is in the mesomorphic, distorted and curvilinearly aligned phase, incident light will be scattered, preferably isotropically, and such scattered light can be used as an identifier that the temperature of the liquid crystal material is below the transition temperature. On the other hand, when the liquid crystal material is in the isotropic phase, incident light is transmitted thereby and, accordingly, the same provides another identifier that the temperature of the liquid crystal material is at or above the transition temperature. The scattering liquid crystal material will appear visually brighter than the transmitting liquid crystal material. Moreover, dye can be added, preferably to the containment medium, to color the scattered light. Also, to maximize longevity and to optimize operation a containment medium that does not dissolve the liquid crystal and that is slow or non-browning in response to elevated temperature is employed.

The terms "transition temperature", "transition point", "clearing temperature", and "clearing point" as used throughout the specification and claims of this application mean the point or temperature at which the liquid crystal composition or compound passes from the mesomorphic phase to the form of an isotropic liquid or isotropic phase.

The present invention preferably employs nematic or smectic liquid crystal material alone or in combination with each other and possibly with cholesteric liquid crystal material. However, the liquid crystal material should primarily be operationally nematic or operationally smectic, which means that such material operates in at least certain ways like nematic or smectic liquid crystal material. Important considerations in such operability include, in particular, the ability of the liquid crystal structure or the orientation thereof to be responsive, and in large part determined, by boundary effect, i.e. the affect of the boundary of the liquid crystal material with, for example, the internal wall of a containment medium within which the liquid crystal material is contained in volumes or capsule-like spaces. Such volumes may be fluidically isolated from each other or may be fluidically connected to one or more similar volumes. The liquid crystal material also should have at least two different phases, one a mesomorphic phase and the other an isotropic phase, the latter usually occurring at and above a specific transition temperature. As used herein, moreover, the terms encapsulating, encapsulated, contained, containment, etc., medium, means a medium, such as an encapsulating or containing medium, for containing such liquid crystal material therein in the aforementioned volumes.

The terms distorted alignment or curvilinearly aligned, etc., refer to the distorting of the natural structure of the liquid crystal material in the mesomorphic or anisotropic phase by the walls of the volumes formed in the containment medium. Such natural structure may be, and preferably is, generally linear. Such distorted or curvilinearly aligned structure may be a forced orientation of the liquid crystal structure to a parallel relation to the volume wall (such volume walls being curved, e.g. for a generally spherical volume, say of capsule-like configuration, would result in a general curving of the liquid crystal structure) or in an alternate embodiment to a generally normal relation to the volume wall. Further description of curvilinear or distorted alignment is presented in the above-referenced patent and applications.

According to one aspect of the invention, then, liquid crystal material for scattering or transmitting light incident thereon as a function of temperature of the liquid crystal is contained in volumes formed in a containment medium which tends to distort the liquid crystal structure when the temperature thereof is below the transition temperature. Due to the unmatched indices of refraction of the liquid crystal material and containment medium, then, incident light will be substantially isotropically scattered. However, at temperatures at and above the transition temperature, due to the clarity of the liquid crystal material and the matching of the indices of refraction of the liquid crystal material and containment medium, incident light will be transmitted and generally not scattered. Therefore, an optical result that is a function of temperature is able to be accomplished by nematic or smectic liquid crystal or a combination thereof without the need for a temperature sensitive color changing cholesteric liquid crystal material or, if desired, with a cholesteric liquid crystal ingredient.

According to another aspect of the invention, light scattered by such mesomorphic or anisotropic phase liquid crystal material in such a temperature sensing device is reflected back to the scattering liquid crystal material to brighten the visual appearance thereof. Moreover, such reflection may be provided, according to still another aspect of the invention, by total internal reflection principles. Such bright appearance would be in contrast to a relatively darker appearance of the liquid crystal material that is above transition temperature in clear, light transmitting isotropic phase.

According to even another aspect of the invention, a liquid crystal temperature sensing and indicating device includes an illuminating light source for illuminating the liquid crystal material during temperature sensing operation. An important advantage of this arrangement is the ability to examine temperatures in dark or other relatively difficult to access.

Still another aspect relates to an improved liquid crystal material, especially for temperature sensing, and methods for making same.

According to further aspects, liquid crystal materials are combined in compositions to achieve a composition with a desired transition point, indeed in some cases below ordinary room ambient temperature; and elimination or reduction of detrimental discoloring of the containment medium and/or absorbing therein of liquid crystal material in response to relatively high temperatures.

An important advantage of the invention is the versatility of temperature responses, and, in particular, the ability to sense or to respond to and to indicate temperatures at relatively elevated levels compared to the lower temperature restriction of cholesteric liquid crystal materials. Such advantage is accomplished, for example, due to the higher temperature capabilities of the liquid crystal material(s) or mixed employed, the reliance on isotropic point and not exclusively on color change, and the matched index of refraction characteristics for maximizing clarity or distinguishability of the output.

According to one embodiment of the invention a temperature sensor and indicator includes liquid crystal for scattering or transmitting light incident thereon as a function of temperature of the liquid crystal, a containment medium for containing plural volumes of the liquid crystal and distorting the natural structure of the liquid crystal when in the mesomorphic phase, and a support for supporting the volumes of liquid crystal in the containment medium for sensing temperature, the liquid crystal having a mesomorphic or anisotropic phase at temperatures below a transition temperature and an isotropic phase at temperatures at and above such transition temperature.

According to another embodiment of the invention a temperature sensor includes liquid crystal material having an isotropic phase at and above a transition temperature and a mesomorphic or anisotropic phase below such transition temperature, a containment medium for containing the liquid crystal material in curvilinear alignment configuration at least at temperatures below such transition temperature, the liquid crystal material, when in such mesomorphic or anisotropic phase, having an index of refraction different from the containment medium to scatter light incident thereon and the liquid crystal material, when in such isotropic phase, having an index of refraction substantially matched to that of the containment medium to reduce such scattering of light incident thereon.

According to an additional embodiment of the invention a composition of matter includes, a) from 0 to 100 mole percent of a first liquid crystal material, and b) from 0 to 100 mole percent of a second liquid crystal material; the composition of matter having a mesomorphic or anisotropic phase at temperatures below a transition temperature and an isotropic phase at and above such transition temperature, and the transition temperature being in the range of about 26° C. to about 75° C. (Note that when 100 percent of one liquid crystal material is used, the other liquid crystal material is not used in the composition; therefore, the transition temperature for a composition using 100 percent of one liquid crystal material would be that of such used liquid crystal material.

According to a further embodiment of the invention, a composition of matter includes:
(a) from 0 to 100 mole percent of a first liquid crystal material, and
(b) from 0 to 100 mole percent of a second liquid crystal material,
(the total amount of material should add to 100 percent) the composition of matter having a mesomorphic or anisotropic phase at temperatures below a transition temperature and an isotropic phase at and above such transition temperature, and each of the first and second liquid crystal material being selected from a respective one of the following compositions,

| | | |
|---|---|---|
| (i) | PePMeOB | 39.6%, |
| | PPPOB | 26.6% |
| | 4-Ethylphenyl-propylbenzoate | 33.8% |
| (ii) | PPMeOB | 60% |
| | PPPOB | 40% |
| (iii) | A mixture of about 52% of | |
| | (1) a mix of | |
| |   PPMeOB 60% and PPPOB 40% | 82% |
| | (2) Bis(4-butoxybenzoyl)-2-methylhydroquinone | 18% |
| | and about 48% of | |
| | (1) CnPPeB | 33% |
| | (2) CnPHepB | 50% |
| | (3) Bis(4-pentylbenzoyl)-2-methylhydroquinone | 17% |

Several abbreviations used herein are, as follows:
PePPOB means 4-n-pentylphenyl-4-n-pentoxybenzoate
PePMeOB means 4-n-pentylphenyl-4-n-methoxybenzoate
CnPPeB means 4-n-cyanophenyl-pentylbenzoate
CnPHepB means 4-cyanophenyl-heptylbenzoate
PPPOB means 4-n-pentylphenyl-4-n-pentyloxybenzoate
PPMeOB means 4-n-pentylphenyl-4-n-methoxybenzoate Also, unless otherwise noted herein percentages of liquid crystal materials are mole percents.

According to yet another embodiment of the invention a composition of matter includes a) from about 30% to less than about 100% Bisbutoxylmethylhydroquinone, and b) from more than about 0% to about 70% Bis-pentylmethylhydroquinone. Such composition may have a transition temperature up to about 205° C.

According to yet an additional embodiment of the invention, a temperature sensor includes liquid crystal for scattering or transmitting light incident thereon as a function of temperature of the liquid crystal, and containment medium for containing plural volumes of the liquid crystal, the containment medium being formed of a material that undergoes no or slow discoloring in response to relatively high temperature and that does not dissolve the liquid crystal at relatively high temperatures.

According to yet a further embodiment of the invention, a temperature sensor includes liquid crystal for scattering or transmitting light incident thereon as a function of temperature of the liquid crystal, and containment medium for containing plural volumes of the liquid crystal, the liquid crystal comprising at least one of nematic liquid crystal material and smectic liquid crystal material in the absence of a cholesteric liquid crystal material admixed therewith.

The foregoing and additional objects, advantages, and features of the invention will become more apparent as the following description proceeds and with appropriate observation of the drawings.

To the accomplishment of the foregoing and related ends, the invention, then, comprises the features hereinafter described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a side elevation view of a liquid crystal temperature sensor in accordance with the present invention operative to scatter light;

FIG. 2 is a top plan view of the liquid crystal temperature sensor of FIG. 1 looking generally in the direction of the arrows 2—2 of FIG. 1;

FIG. 3 is a side elevation view of the liquid crystal temperature sensor wherein the liquid crystal material is in the isotropic phase;

FIG. 4 is a schematic section view illustration of a capsule or volume of a containment medium containing liquid crystal material in the mesomorphic of curvilinearly aligned phase;

FIG. 5 is a schematic section view illustration of a capsule or volume of a containment medium containing liquid crystal material in the isotropic phase;

FIG. 6 is a view similar to FIG. 4 in which the liquid crystal structure is aligned generally normal to the capsule or volume wall;

FIG. 7 is an illustration of another alternate embodiment of a volume of encapsulated liquid crystal material and a containment medium with an additive for enhancing the return of the liquid crystal material from isotropic phase to mesomorphic, curvilinearly aligned phase;

FIGS. 8 and 9 are, respectively, fragmentary schematic section views of liquid crystal material, respectively, in mesomorphic, curvilinearly aligned phase and in isotropic phase, as used to scatter or to transmit light in connection with the liquid crystal temperature sensor of FIGS. 1-3;

FIG. 10 is a schematic section view illustration of a capsule or volume of a containment medium containing liquid crystal material in the mesomorphic of curvilinearly aligned phase similar to the illustration of FIG. 4, but with the addition of dye to the containment medium; and FIG. 11 is a graph depicting the relationship between compositions of respective mixtures of liquid crystal material in accordance with the invention and transition temperature thereof.

DESCRIPTION OF THE PREFERRED EMBODIMENT

Referring in detail to the drawings, wherein like reference numerals designate like parts in the several figures and initially to FIGS. 1, 2 and 3, a liquid crystal temperature sensor in accordance with the present invention is generally indicated at 1. The fundamental components of the liquid crystal temperature sensor 1 include at least one, in the preferred illustrated embodiment four, temperature sensitive liquid crystal segments 2-5, a support 6 for supporting those segments, and preferably a light source 7 for directing incident light to the liquid crystal segments. A combination handle and housing 10 encloses the light source 7, provides a mounting for the support 6, and facilitates manual manipulation of the liquid crystal temperature sensor 1.

As will be described in greater detail below, each liquid crystal segment 2-5 is formed of liquid crystal material in a containment medium that tends to distort the natural liquid crystal structure to a curvilinearly aligned formed when in the mesomorphic phase; and each segment 2-5 has a unique transition temperature at and above which the liquid crystal therein changes to isotropic phase. In the mesomorphic, curvilinearly aligned phase, each segment tends to scatter light incident thereon, and in the isotropic phase, the segment(s) tend(s) to transmit light incident thereon. The light source 7 provides a source of illumination for the liquid crystal segments 2-5. Such illumination is provided along an optical path represented at 11 generally in parallel to the support 6, as is seen in FIG. 1. A window 12 in the housing 10 provides an exit for light from the source 7 to travel along the light path 11.

The light source 7 is connected in an electrical circuit 13, which includes a battery 14 for energizing the light source and a switch 15, such as a push button switch that may be selectively closed to complete the circuit 13 for energizing the light source 7 to emit light. The housing 10 may include a track 16 along which the support 6 may slide to withdraw the support and the liquid crystal segments 2-5 into the housing for protected storage. For that purpose, using thumb pressure or force while the housing 10 is held in a hand, the top of the switch 15 may be urged to the right, relative to the illustration in FIGS. 1-3, to slide the support 6 also to the right and into the housing. During such sliding the switch/button 15 slides along a slot 17 provided in the top of the housing. If desired, the switch 15 may be separate from a device employed to effect the aforementioned sliding motion.

Preferably the support 6 is formed of a good thermally conductive material, such as, for example, steel coated with aluminum or nickel. The thermal condition properties of the support 6 facilitate conducting heat to the liquid crystal segments 2-5. The support 6 may be generally reflective; although in the preferred embodiment and best mode of the invention, part of the top surface of the support 6 is black or in any event made to be of minimal reflectivity to avoid reflecting light transmitted along path 11, while those portions of the support 6 directly beneath the liquid crystal segments 2-5 preferably are optically reflective to facilitate and to enhance brightening of the liquid crystal segments when the same are operative to scatter light.

To use the liquid crystal temperature sensor 1 in accordance with the present invention, the switch 15 is slid to the left to expose the support 6 and liquid crystal segments 2-5 from the housing 10. The switch 15 is closed, e.g. by pressing same, to energize the circuit 13 causing the light source 7 to direct light along the light path 11 toward the liquid crystal segments 2-5. The support 6 is placed into engagement with a surface, device, environment, etc., the temperature of which is to be sensed. Those liquid crystal segments 2-5, if any, that remain in the mesomorphic, curvilinearly aligned phase, will tend to scatter light received along the light path 11, such scattering being represented at 20 in FIG. 1 for visual observation by a user looking in the direction 21 toward the top surface 22 of the respective liquid crystal segments. Those scattering liquid crystal segments will appear relatively bright on visual inspection, e.g. from the top. However, those liquid crystal segments 2-5, if any, which are raised to a temperature that is at or above the transition temperature, will become clear and no longer will scatter light. In fact, what will occur is that light directed along the light path 11 from the source 7 will tend to be transmitted through such liquid crystal segment(s), if any, escaping out through the end 23 of the liquid crystal segment(s) along a continuation 24 of the light path 11. Accordingly, such segments of liquid crystal material that are in the isotropic phase will appear relatively dark compared to those which are in the mesomorphic, scattering phase.

Turning now to FIG. 4, one of the many volumes 29 of contained liquid crystal material in accordance with the present invention is shown schematically. Such volume 29 is represented as a single capsule. However, as is mentioned above, it will be appreciated that the volumes may be fluidically interconnected with one or more of the same in a given liquid crystal segment 2-5, for example. The volume or capsule 29 includes liquid crystal material 30, a number of the molecules or structural components 31 thereof being shown by the various dashed lines in the figure contained within a capsule 32. At the interior wall 33 of the capsule 32 defining the boundary of the volume of liquid crystal 30 the liquid crystal molecules or structural components 31 are distorted from normal straight line configuration, which is the natural structural of nematic and smectic liquid crystal material, to a curvilinearly aligned configuration or structure that is generally parallel to the wall 33. In particular, those molecules or structural components 31 which are most proximate the wall 33, i.e. at the boundary therewith, for example those represented at 34, are close to parallel, if not completely parallel, to the wall 33, and those molecules or structural components represented at 35 or remote from the wall 33 still tend to have a curvilinearly aligned structure due to the influence of the liquid crystal proximate the wall 33. Additionally, due to the distortion of the liquid structure in the capsule 32, there may occur a discontinuity 36 in the structural alignment of the liquid crystal to allow the liquid crystal to assume a lowest free energy state in the capsule when otherwise undisturbed.

The capsule 32 preferably is formed of a binding medium, containment medium, support medium, etc., that preferably is generally optically transparent (or may be dyed with an appropriate color dye, if desired). Such medium has an index of refraction. To achieve the desired scattering of light when the liquid crystal material 30 is in the mesomorphic or anisotropic phase curvilinearly aligned, as is shown, for example, in FIG. 4, the index of refraction of such liquid crystal material is greater than, and preferably much greater than, the index of refraction of the medium. As a result of such distortion of the liquid crystal structure and the difference between such indices of refraction, light, such as that traveling along light path 11 (FIG. 1) incident on a liquid crystal segment including a plurality of volumes 29 of liquid crystal material 30 will tend to be scattered substantially isotropically. Such scattered light may be seen by looking in the viewing direction 21, whereby the respective liquid crystal segment(s) 2(-5, i.e. those below the respective transition temperature) will appear relatively bright to an observer.

When the liquid crystal material 30 in the volume 29 is raised to the transition temperature or above the transition temperature, such liquid crystal material becomes an isotropic material, which is schematically represented in FIG. 5. Such isotropic material is represented in FIG. 5 by a plurality of dots; such dots are intended to represent a change in the liquid crystal structure from the curvilinearly aligned structure to the isotropic phase. Importantly, to maximize light transmission through the liquid crystal capsule or volume 29 when the liquid crystal material is in the isotropic phase, the index of refraction of such liquid crystal material in the isotropic phase preferably is matched to be substantially the same, if not identical, to the index of refraction of the containment medium 32. Such proximity or identity of those indices of refraction will permit maximum undistorted, unrefracted, and unscattered transmission of light through the respective liquid crystal segment(s) 2 (-5), for example, in the manner illustrated in FIG. 3 described above. In this event since minimum light is scattered for viewing in the viewing direction 21, the respective liquid crystal segment(s) 2 (-5) in the isotropic phase will appear relatively dark compared to the scattering liquid crystal material still in the mesomorphic phase, for example.

Briefly referring to FIG. 6, the volume 29' of encapsulated or contained liquid crystal material 30' in accordance with another embodiment of the invention is illustrated. The primary difference between the volume 29' of FIG. 6 and the volume 29 of FIG. 4 is that in FIG. 6 the liquid crystal molecules or structural components 31' are aligned generally at a nonparallel angle with respect to the capsule 32' wall 33'. In fact, the liquid crystal structure in FIG. 6 tends to be aligned in what may be referred to as normal or perpendicular alignment with the wall 33' at the boundary or interface with such wall, and the other liquid crystal in the volume 29' more remote from that boundary also tends to be influenced by the boundary condition and alignment so as to retain characteristics of normal alignment, as is seen in the drawing. Operation of the embodiment illustrated in FIG. 6 would be similar to operation according to the embodiments illustrated in FIGS. 4 and 5, as was described in greater detail above. Specifically, light scattering will occur when the liquid crystal structure is curvilinearly aligned in the form, for example, illustrated in FIG. 6; and a reduction in scattering, and preferably transmission of light, will occur when the liquid crystal material is in the isotropic phase at and above the transition temperature.

An important advantage of the present invention over the prior color changing cholesteric liquid crystal temperature sensor devices is the ability of the nematic and/or smectic liquid crystal that may be used in the present invention to withstand temperatures up to approximately 205° C. Ordinarily cholesteric liquid crystal will not function satisfactorily at temperatures above 100° C. Therefore, the present invention as particularly high temperature operational capability. In the above-mentioned U.S. Pat. No. 4,140,016, an inert additive is required to achieve desired twist in the nematic liquid crystal. Such additive is described, for example, as a cholesteric material. Therefore, the device of such patent would not necessarily be expected to operate at the higher temperatures at which the present invention would be operable.

However, according to the embodiment illustrated in FIG. 7, for example, which may be construed as a relatively lower temperature capability embodiment of the present invention, a volume 29" of contained or encapsulated liquid crystal material, for example similar to that described above with reference to the volume 29 illustrated in FIG. 4, also includes an additive 39. The additive 39 may be, for example, a chiral additive which tends to expedite and to enhance distortion—not twisting—of the liquid crystal material 30" in the capsule 32".

Turning now to FIGS. 8 and 9, an enlarged view of a preferred embodiment and best mode of the present invention in the form of a liquid crystal segment 2, respectively in the mesomorphic, curvilinearly aligned, anisotropic phase and isotropic phase is illustrated. The segment 2 is formed of a plurality of volumes 29, for example, of liquid crystal material 30 and a containment medium 32. The containment medium may be, for example, polyvinyl alcohol, and preferably is a combination thereof with carboxylic acid-containing polymers such as described in more detail below which medium also may form protective layers 40, 41 above and below the so-called encapsulated liquid crystal layer 42. The containment medium prevents contamination of the liquid crystal material in the volumes 29. Such layers 40, 41 may be reduced in height and/or may be eliminated, especially if the protective function thereof is not required. The support 6 has a polished or optically reflective coating 43 beneath the area where the segment 2 is formed to reflect light inpinging on such surface.

Incident light 44 along path 11 from the light source 7 (FIG. 1) impinges on the liquid crystal layer 42 as well as on the protective layers 40, 41. Since the protective layers 40, 41 generally are optically transparent, the light 44 impinging thereon will tend to be transmitted through the same and out through the left-hand end thereof, relative to the illustration of FIG. 8. However, light impinging or incident on the mesomorphic liquid crystal layer 42 will tend to be scattered preferably substantially isotropically thereby. An example of one light ray or beam scattered out through the top surface 45 of the segment 2 for viewing from the viewing direction 21 is illustrated at 50. Light scattered or reflected toward the surface 45 and falling within a relatively narrow cone angle with respect to a normal to the surface, such as the ray 50, which is perpendicular to the surface 45, will tend to be transmitted out through such surface for viewing. However, another scattered light ray 51 outside such cone angle and incident on the interface of the surface 45 with the external environment, such as air (represented at 52), will be totally internally reflected at such interface as ray 53 back toward the liquid crystal layer 42 for further illuminating and effectively brightening the same. Such total internal reflection will occur when the index of refraction of the layer 40, such as polyvinyl alcohol or combination thereof with other polymeric material (described in greater detail below), exceeds the index of refraction of the external medium 52, such as air, when the angle of the light ray 51 is outside the predetermined cone angle, as would be apparent to those having ordinary skill in the art and as is described, for example, in several of the above-referenced copending patent applications.

Another possibility of scattering of the light incident on the layer 42 is represented by light ray or beam 54, which either is reflected by the reflector surface 43 or by total internal reflection occuring in the protective layer 41 at the interface with the support 6 or other medium, as light ray 55 directed back to the liquid crystal layer 42 still further enhancing or brightening the same. Some of the light scattered by the liquid crystal layer 42 also may be transmitted out of the left side or right side of the layer relative to the illustration of FIG. 8; but a relatively small amount of such side-wise scattering will occur.

In FIG. 9 the liquid crystal material 30 in the containment medium 32 is in the isotropic phase. Therefore, the liquid crystal layer 42 is substantially optically transparent. Accordingly, the incident light 44 along light path 11 is transmitted substantially completely through the segment 2, as is represented by the light 44' exiting the segment at the left-hand side thereof. As a result, from the view direction 21 the segment 2 will appear relatively dark or black, especially relative to other bright scattering segments.

Thus, it will be appreciated that the liquid crystal temperature sensor 1 provides the ability to sense temperatures at relatively high levels. The invention also provides for high visibility to distinguish the difference between the scattering/bright, specifically the enhanced brightness, of that contained liquid crystal material which is in the mesomorphic or anisotropic phase relative to that liquid crystal which is in the isotropic phase. Reflection provided by total internal reflectance properties and the reflection occuring at the surface 43 further enhances brightness of the liquid crystal material in the mesomorphic phase. If desired, the surface 43 may be partly reflective, non-reflective or even optically absorbent, but scattering by the mesomorphic liquid crystal still will occur and brightness still will be enhanced to the extent that total internal reflection still would be occuring at the interface 45 and/or partial reflection occurs at the partial reflector. The advantage of an absorbent surface 43 is the ability thereof to absorb incident light further darkening the appearance of an isotropic liquid crystal material segment that is above transition temperature. A spacer (not shown) may be provided between the absorbent surface 43 and the bottom of the liquid crystal layer 42 or protective layer 41 to improve total internal reflection characteristics as is described, for example, in several of the above-referenced applications.

The invention preferably employs nematic liquid crystal material or smectic liquid crystal material, both of which are capable of curvilinear alignment or distortion in the manner described above and both of which in response to temperature generally exhibit a change in optical characteristics other than direct color changes, the latter primarily being the case with respect to cholesteric liquid crystal material.

Preferably the liquid crystal materials employed have a good clearing point (transition temperature) both in terms of optical clarity (above the clearing point) and accuracy, narrowness of distinctiveness of the clearing point (i.e. the clearing point temperature accruately is defined and that the same has been reached easily is observable). Exemplary liquid crystal materials which have these characteristics are those of the hydroquinone group. It also has been found that liquid crystal materials which are derivatives of the alkyl phenol esters are particularly desirable because they have very narrow clearing points and, therefore, are very accurate for temperature measuring function.

Furthermore, preferred liquid crystal materials for the present invention are those which will mix well with each other to provide a clearing point that is a function of the respective clearing points and relative amounts of the liquid crystal materials mixed. Not all liquid crystal materials are mixable to form a good clearing point material. However, it has been found that liquid crystal materials that are esters and hydroquinones do mix well and do provide a good clearing point (i.e. accurately defined and readily distinguishable and observable).

As was mentioned above, liquid crystal materials useful in accordance with the invention may be compositions which are derivatives of hydroquinones, and more particularly, methyl hydroquinones. The liquid crystal materials of this type can be represented by the following formula

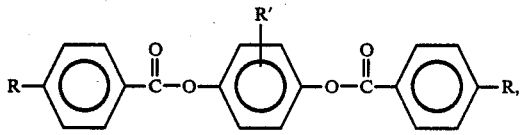

wherein each R is independently a lower alkyl or lower alkoxy group, and R' is a lower alkyl group. In the context of this invention, lower alkyl or lower alkoxy group is intended to include groups containing from about 1 to about 8 carbon atoms. Specific examples of the R groups include methyl, ethyl, propyl, butyl, pentyl, octyl, methoxy, ethoxy, propoxy, butoxy, pentoxy, hexoxy, etc. R' preferably is a methyl group.

Exemplary radicals R and the isotropic transition temperature of a liquid crystal material including the same and wherein $R^1$ is methyl are

| Radical | Transition Temp.(°C.) |
|---|---|
| R = pentyl | 140° |
| R = butyloxy | 206° |
| R = hexyloxy | 172° |
| R = butyl | 139° |

Specific examples of the hydroquinone-based liquid crystal materials used in this invention including their transition temperature include the following: bis-(4-butoxybenzoyl)-2-methyl hydroquinone (204° C.), bis-(4-pentylbenzoyl)-2-methyl hydroquinone (140° C.), bis-(4-pentoxybenzoyl)-2-methyl hydroquinone, bis-(4-hexoxybenzoyl)-2-methyl hydroquinone (172° C.), bis-(4-butylbenzoyl)-2-methyl hydroquinone, bis-(4-methoxybenzoyl)-2-methyl hydroquinone, etc. Mixtures of these hydroquinone-based liquid crystal molecules may be utilized.

Other materials that could be added to a hydroquinone chain and used as liquid crystal material according to the invention include carboxylic esters, such as acetate, propionate, butyrate, hexanoate, etc., and carboxy, such as methyl carboxy, ethyl carboxy, pentyl carboxy, etc.

Other exemplary liquid crystal materials useful according to the invention include, for example, those listed in Table 1 below. Table 1 also indicates which materials can readily be combined, and transition temperature of each material is indicated.

TABLE 1

| Nematic Liquid Crystal Mixtures | | Transition Point (°C.) |
|---|---|---|
| PePPeOB | 4-n-pentylphenyl-4-n-pentoxybenzoate and | 55° |
| PePMeOB | 4-n-pentylphenyl-4-n-methoxybenzoate or | 42° |
| | 4-n-pentylphenyl-4-n-methoxybenzoate and | 42° |
| | 4-n-butylphenyl-n-heptylbenzoate or | 15° |
| | 4-n-hexyloxyphenyl-4-n-butylbenzoate and | 50° |
| | 4-n-heptoxyphenyl-4-n-butylbenzoate or | 43° |
| | 4-n-ethoxybenzyl-4-n-butylaniline and | 75.6° |
| | 4-n-butoxybenzyl-4-n-butylaniline | 72.1° |

(an example of a smectic liquid crystal material)

An important advantage of the invention is that using the 15° C. liquid crystal material of Table 1, for example, a composition, including such liquid crystal material and one or more others, having a transition temperature that is below ordinary room ambient temperature of, say, about 18° C. to about 25° C. is possible and can be used in a liquid crystal temperature sensor according to the invention.

The liquid crystal segments 2–5 may be dyed, if desired. If dyed the segments may be dyed the same or different respective colors using preferably non-pleochroic dye(s). Exemplary dyes may be ordinary food coloring dyes. The dye preferably is mixed with the containment medium or the dye may be applied by imbibition using one of the processes described in the above-referenced application Ser. No. 480,461. Preferably the dye is a water soluble dye capable of dissolving in the or a component of the containment medium without affecting or dissolving in the liquid crystal. Examples of such a dyed volume 29''' of liquid crystal material according to the invention is illustrated in FIG. 10, where dye 60 is shown in the containment medium 32. An advantage of the enhanced brightness of the mesomorphic liquid crystal scattering light is that since the light on average makes several passes through the encapsulated or contained liquid crystal material, a relatively small amount of dye will still effect a substantial coloring of the light scattered out from the liquid crystal segment to the viewing direction 21. Desirably the dye is a high visibility dye, e.g. of green or magenta color, for maximizing brightness. Ordinarily a dyed segment of isotropic phase liquid crystal material would be darker and less colored, preferably nearly uncolored in appearance, relative to a scattering segment.

One example of a preferred liquid crystal material useful in accordance with the invention hereof is a liquid crystal that is a derivative of methyl hydroquinone.

EXAMPLE 1

A mixture of 32.5% (mole percent) of bis(4-butoxybenzoyl)-2-methylhydroquinone and 67.6% of bis(-pentylbenzoyl)-2-methylhydroquinone was formed. (In Examples 2–5 below, the compounds will be referred to as materials A and B, respectively. Both are or have properties of nematic liquid crystal.) About 10 ml chloroform (used as a solvent) was placed in a beaker, and about 4½ grams of such mixture was dissolved in the chloroform. About 20 grams of 17% by weight solution polyvinyl alcohol (20/30 PVA by Monsanto, the remaining 83% by weight of the PVA solution was water) was placed in a beaker, and while stirring the same with a dremel (high speed mixer that produces high shear), the chloroform and liquid crystal mixture was added slowly. After such addition, the mixture was dremeled for a few additional minutes. The resulting mixture of encapsulated liquid crystal material has a shelf life of months. As an alternative, a small blender instead of a dremel could also be used to carry out such encapsulation.

To the above "original" mixture, a 15% by weight solution of Gantrez AN-169 (by GAF, the remaining 85% by weight of Gantrez solution being water) was added and stirred. The original mixture was 60% by weight of the final mixture, and the Gantrez solution was 40% by weight of the final mixture. The final mixture has a shelf life of only a few days. (Therefore, desirably the Gantrez AN-169 ordinarily would be added just prior to use/application of the encapsulated liquid crystal mixture.)

One or more thin layer(s) of the final mixture was (were) coated on an aluminum or nickel reflecting support surface and allowed to air dry between each coating. The resulting material was like one of the segments 2-5 described above in form and function; the same had a transition temperature of about 163° C.

Pure material A has a transition temperature or clearing point at about 204° C. and a melting point of 113° C.; and pure material B has a transition temperature or clearing point at about 140° C. and a melting point of about 62° C.

EXAMPLE 2

The method and materials of Example 1 were employed except that a 20% by weight solution of Gantrez AN-169 (the remaining 80% by weight of such solution being water) was substituted for the 15% Gantrez AN-169 of Example 1. The results of the product formed and operation thereof were substantially the same as in Example 1.

EXAMPLE 3

The method of Example 1 was followed except that material A was 54.4% of the liquid crystal mixture and material B was 45.6% of the liquid crystal mixture. Such mixture showed a transition temperature or clearing point of about 177° C.

EXAMPLE 4

The method of Example 1 was followed except that material A was 77.0% of the liquid crystal mixture and material B was 23.0% of the liquid crystal mixture. Such mixture showed a transition temperature or clearing point of about 191° C.

such mixtures. The mixtures of Examples 1-5 did not experience any crystallization problems.

Several characteristics of the containment medium are noted. For example, it is desirable that the containment medium be water resistant—such medium should not dissolve in water. The liquid crystal material and components therein should not be soluble in the containment medium. Furthermore, for high temperature uses, say above 100° C., the containment medium should be temperature resistant, for example, is optically and otherwise stable; particularly such medium should not brown or otherwise discolor or at least should only discolor relatively slowly in response to relatively high temperatures and should remain substantially optically transparent.

Examples of containment or encapsulating medium materials that may be employed in accordance with the present invention, such as polyvinyl alcohol (hereinafter sometimes referred to as PVA), Gantrez (used interchangeably herein to refer to polymaleic products, in particular to a poly(methylvinylether/maleic anhydride) which is sold by GAF, and to equivalent materials—where Gantrez is referred to herein it is to be understood that equivalent materials may be employed in place thereof), gelatin, Carbopole (a carboxy polymethylene polymer of B. F. Goodrich Chemical Corporation—where Carbopole is referred to herein it is to be understood that equivalent materials may be employed in place thereof), other polymers, etc., are presented in the above referenced patent and applications which deal with encapsulated or contained distorted and curvilinearly aligned liquid crystal, and the same are incorporated by reference in their entireties. Examples and characteristics of several PVA materials useful in the invention are shown in Table 2, as follows:

TABLE 2

| CONTAINMENT MEDIUM (PVA) | VISCOSITY | % HYDROLYZED | MOLECULAR Wgt. | TEMPERATURE & % SOLUTIONS |
|---|---|---|---|---|
| 20-30 Gelvatol, by Monsanto Company | 4-6 CPS | 88.7-85.5 | 10,000 | 4% at 20° C. |
| 40-20 Gelvatol, by Monsanto Company | 2.4-3 CPS | 77-72.9 | 3,000 | 4% at 20° C. |
| 523 Air Products and Chemicals, Inc. | 21-25 | 87-89 | — | 4% at 20° C. |
| 72-60 Elvanol, by DuPont Company | 55-60 | 99-100 | — | 4% at 20° C. |
| 405 Poval, by Kurashiki | 2-4 CPS | 80-82 | — | 4% at 20° C. |

EXAMPLE 5

The method of Example 1 was followed except that material A was 100.0% of the liquid crystal mixture and no material B was used. Such material showed a transition temperature or clearing point of about 204° C.

The foregoing presents several examples of high temperature liquid crystal materials and mixtures thereof that may be used as the liquid crystal composition in the liquid crystal temperature sensor of the invention. It will be appreciated that such materials may be used at different respective segments 2-5 of the device 1 (FIGS. 1-3) to provide an indication of whether the temperature sensed by the invention exceeds any one or more of the clearing points or transition temperatures of Although some of the aforesaid materials may be used alone or in various mixtures and combinations, some of such materials may encounter browning at elevated temperature and (especially polymers) also may tend to dissolve the liquid crystal at elevated temperatures.

It has been discovered that the inclusion of Gantrez or Carbopole in the containment medium helps to improve the water resistance of the encapsulated or contained liquid crystal material as a whole. This is particularly true for containment media formed of mixtures of PVA and Gantrez and mixtures of PVA and Carbopole; the Gantrez and the Carbopole materials or types of materials prevent water solubility of the PVA. Gantrez is sold by GAF and generically may be identified as poly(methylvinylether/maleic anhydride). A preferred Gantrez product is that sold by GAF as Gantrez AN-169. Other Gantrez products that would work in the invention are those identified as Gantrez AN-119, -139, and -149; but Gantrez AN-169 is preferred. Other equivalent functioning polymaleic products also may be substituted for Gantrez. Equivalent products also may be substituted for the Carbopole material.

Preferred containment medium of the liquid crystal in accordance with the invention, especially for relatively high temperature liquid crystal sensors, is a combination of polyvinyl alcohol and Gantrez. The polyvinyl alcohol is water soluble and can readily be mixed with water soluble dye to provide a coloring of the containment medium. The water soluble polyvinyl alcohol also conveniently can be used to encapsulate an oil base or oil soluble liquid crystal material to form the desired volumes of liquid crystal, e.g. by mixing the PVA and liquid crystal to form an emulsion or an emulsion-like consistency material of PVA and liquid crystal. The addition of Gantrez to such emulsion would result in a reaction between the PVA and Gantrez to form a polyester. The polymaleic product, such as Gantrez, or equivalently used material, should be water soluble so it will mix well and react well with the PVA. Polyester is insoluble in water and results in a final containment medium that is quite stable when allowed to set up as, for example, an encapsulated liquid crystal layer 42 in a segment 2-5.

Gantrez, more particularly, poly(methylvinylether/maleic anhydride), may be used alone as a containment medium, i.e. without being combined with PVA. However, properties, e.g. with respect to water resistance and optical stability at high temperature, would not be as desirable as those properties would be using a combination of Gantrez and PVA.

It has been found that such containment medium of resulting polyester or in any event of polyvinyl alcohol and poly(methylvinylether/maleic anhydride), preferably Gantrez, has relatively stable optical characteristics, including particularly the ability even when subjected to relatively high temperatures not to discolor or to brown or at least only to undergo relatively slow discoloring or browning, especially when compared to the relatively rapid discoloring of other containment media. The liquid crystal material also does not tend to discolor or to dissolve in the resulting polyester containment medium of the invention.

The preferred PVA is that identified as 20/30, which is an indication of the viscosity. Other PVA materials also may be used. Such materials should have suitable viscosity to achieve desired lay down (e.g. on support 6 while in emulsion with liquid crystal material) levelling, and like characteristics that may be a function of viscosity and viscosity control.

Any ratio of PVA and Gantrez (or other equivalent polymaleic product) may be used to form the containment medium. However, preferably the containment medium should be formed of, for example, from about 5% to about 80% Gantrez (or equivalently functioning polymaleic product) and from about 95% to about 20% PVA. Most preferred would be a ratio that is about mid-range of the noted preferred ratios. According to the preferred embodiment and best mode of the present invention, then, the best non-browning containment medium is formed of PVA and Gantrez in the ratio ranges just mentioned above.

As was mentioned above, the liquid crystal material should not be soluble, indeed it should not have partial solubility, in the containment medium, whether the latter is PVA, Gantrez, other material, or mixture(s) thereof. Thus, all components of the liquid crystal material should stay in the liquid crystal material and should not dissolve in the containment medium.

The solvent mentioned in Examples 1-5 above was chloroform. Other solvents also may be used; examples include dimethylglycol ether and diethylglycol ether.

According to the invention various transition temperatures can be achieved for liquid crystal material compositions by mixing plural liquid crystal materials that have different respective transition temperature characteristics. The resulting composition will have a transition temperature that is a function of or related to the transition temperature of each ingredient and the relative amounts of each ingredient in the composition. Indeed, as is shown in FIG. 11, the transition temperature of a mixture of liquid crystal materials having different transition temperatures will vary generally linearly with respect to the relative amounts in mole percent of the liquid crystal materials used in the liquid crystal mixture or composition. The slope of each curve in FIG. 11 will be a function of the transition temperature of each ingredient in the composition.

EXAMPLE 6

A number of mixtures of liquid crystal material(s) will encapsulating or containment medium were made and the clearing point or transition temperature for each were measured. The results of such measurements were graphed, as is shown in FIG. 11. Curve 100 in FIG. 11 represents various mole percent (mixtures) of liquid crystal mixture(s) C and/or D; curve 101 represents various mole percent of liquid crystal mixture(s) C and/or E; and curve 102 represents various mole percent of liquid crystal mixture(s) D and/or E. Mixes C, D, and E are defined below. Thus, at the lower left-hand end of curve 100, the liquid crystal mixture made and tested for clearing point consisted substantially exclusively of liquid crystal mixture C; and at the upper right-hand end of curve 100 the liquid crystal made and tested for clearing point consisted substantially exclusively of liquid crystal mixture D. At the various mid-portions of curve 100 are represented combinations of liquid crystal mixtures C and D in the approximate mole percents represented on the vertical axis of the graph of FIG. 11; and the clearing point of such material can be read along the horizontal axis at the bottom of the graph.

For Example 6, the encapsulation material or containment medium was formed of 22% by weight (the rest was water) of 20/30 polyvinyl alcohol with a 0.1% surfactant of LD-630 (by GAF) and a selected amount of dye. Also, a 20% by weight solution of Gantrez was mixed with the mixture or emulsion of liquid crystal material and encapsulation material as is described herein.

The dye was green food color from McCormick. Different concentrations of dye were tested empirically until a good contrast before and after clearing was achieved. The amount of dye empirically determined was approximately 1 ml of dye in 250 ml of polyvinyl alcohol solution. Different amount and/or colors of dye may be used for each encapsulated liquid crystal material element (shown as elements 2-5 in FIG. 1, for example) used to indicate different respective temperatures, thus facilitating visual temperature discrimination by a person using a liquid crystal temperature sensor 1 according to the invention.

The purpose of the surfactant used in Example 6 is to provide better coating properties of the encapsulated liquid crystal material, i.e. to facilitate applying the same in a generally uniform manner to a surface, such as the surface of the support 6 (FIG. 1). Uniformity may be of thickness and/or other characteristics of the encapsulated liquid crystal layer comprised of the liquid crystal material and containment medium. Surfactants, including the exemplary LD-630 and/or others, not soluble in the liquid crystal material itself or which are preferentially held in the containment medium may be used according to this aspect of the invention.

The liquid crystal material used, namely those identified above as mixtures C,D, and E were, as follows:

| (Mix C) | PPMeOB- | 39.6%, |
|---|---|---|
| | PPPOB- | 26.6% |
| | Ethylphenyl-propylbenzoate- | 33.8% |
| (Mix D) | PPMeOB- | 60% |
| | PPPOB- | 40% |
| (Mix E) | A mixture of about 52% of | |
| | (1) A mix of PPMeOB 60% and PPPOB | 40%–82% |
| | (2) bis(4-butoxybenzoyl)-2-methylhydroquinone- | 18% |
| | and about 48% of | |
| | (1) CnPPeB- | 33% |
| | (2) CnPHepB- | 50% |
| | (3) bis(pentylbenzoyl)-2-methylhydroquinone- | 16.6% |

The liquid crystal temperature sensor also would work without the dye mentioned in this Example 6. However, if dye is used, as is described in this Example 6, then the dye should be water soluble which dissolves in the containment medium but will not dissolve in the liquid crystal material and cause a shift in the temperature, etc. characteristics of the liquid crystal material. The dye also should be a relatively high visibility dye, such as green or magenta to maximize the visibility of the liquid crystal segments of the liquid crystal temperature sensor of the invention.

According to the method of encapsulation of the liquid crystal material(s) selected from one or two of the above Mixes C, D, and E, 15 grams of polyvinyl alcohol 20/30, 22% solution (the other 78% being water), with dye was placed in a 50 ml beaker, and the ingredients were stirred with a dremel at medium speed. While the stirring continued, 5 grams of filtered liquid crystal material the selected liquid crystal Mix or Mixes was (were) added dropwise. The mixture was stirred for an additional ½ minute after such addition of liquid crystal material producing an emulsion. To the final emulsion was added a solution of 20% Gantrez.

A slide was prepared and checked under a microscope for unencapsulated liquid crystal material. The ideal mixture was determined to have relatively large capsule sizes with total encapsulation, i.e. all the liquid crystal material encapsulated. The clearing temperature of each sample was checked after the slide was completely dry, and the results are presented on the graph of FIG. 11.

As is seen in the graph of FIG. 11, the clearing or transition temperatures of the materials used in Example 6 ranged from about 25° C. to about 70° C. Such temperature range is lower than that of the materials used to sense higher temperatures, e.g. presented in Examples 1–5, and, therefore, the need for Gantrez in the containment medium of the lower temperature compositions to prevent browning, etc., ordinarily would be unnecessary, as long as a device using such lower temperatures ordinarily would not be subjected to the relatively higher temperatures. PVA or equivalent material that prevents contamination of the liquid crystal material preferably should be used in both the relatively lower and higher temperature sensor embodiments disclosed herein.

STATEMENT OF INDUSTRIAL APPLICATION

With the foregoing in mind, it will be appreciated that the various liquid crystal materials contained in volumes in a containment medium may be placed on a support and used to sense temperature and to provide output information of the sensed temperature.

I claim:

1. A temperature sensor and indicator, comprising
    liquid crystal means for scattering or transmitting light incident thereon as a function of temperature of said liquid crystal means,
    containment means for containing plural volumes of said liquid crystal means, said containment means comprising means for distorting the natural structure of said liquid crystal means to distorted, curvilinearly aligned structure, and
    support means for supporting said volumes of liquid crystal means in said containment means for sensing temperature,
    said liquid crystal means having a mesomorphic or anisotropic phase at temperatures below a transition temperature and an isotropic phase at temperatures at and above such transition temperature.

2. The invention of claim 1, further comprising reflecting means for reflecting light scattered by said liquid crystal means.

3. The invention of claim 2, said reflecting means comprising an interface with at least one of said containment means and said support means for effecting total internal reflection of light impinging on such interface at an angle greater than a prescribed angle with respect to a normal to such interface.

4. The invention of claim 2, said reflecting means comprising a surface of said support means on which said liquid crystal means and containment means are positioned.

5. The invention of claim 1, further comprising light source means for illuminating said liquid crystal means in said containment means.

6. The invention of claim 5, said light source means being positioned with respect to said liquid crystal means and containment means to direct incident light thereon generally along a path out of the expected viewing direction of said liquid crystal means.

7. The invention of claim 1, said liquid crystal means comprising plural segments of liquid crystal means in containment means mounted on said support means, a plurality of said segments having different respective transition temperatures.

8. The invention of claim 1, said liquid crystal means comprising a composition of matter, including
    (a) from 0 to 100 mole percent of a first liquid crystal material, and
    (b) from 0 to 100 mole percent of a second liquid crystal material,
    said composition of matter having a mesomorphic or anisotropic phase at temperatures below a transition temperature and an isotropic phase at and above such transition temperature, and said transition temperature being in a range of about 15° C. to about 205° C.

9. The invention of claim 8, wherein such transition temperature is a function of the transition temperature of each of said liquid crystal materials and the relative amount of each liquid crystal material in the composition.

10. The invention of claim 9, wherein such transition temperature of the compositions is in the range of from about 26° C. to about 75° C.

11. The invention of claim 1, said liquid crystal means comprising a composition of matter, including (a) from 0 to 100 mole percent of a first liquid crystal material, and (b) from 0 to 100 mole percent of a second liquid crystal material, said composition of matter having a mesomorphic or anisotropic phase at temperatures below a transition temperature and an isotropic phase at and above such transition temperature, and each of said first and second liquid crystal material being selected from a respective one of the following compositions, (percentages refer to mole percent)

| (Mix A) | PPMeOB- | 39.6% |
| | PPPBO- | 26.6% |
| | Ethylphenyl-propylbenzoate | 33.8% |
| (Mix B) | PPMeOB- | 60% |
| | PPPOB- | 40% |
| (Mix C) | A mixture of about 52% of | |
| | (1) a mix of | |
| | PPMeOB 60% and PPPOB 40% | 82% |
| | (2) bis(4-butoxybenzoyl)-2-methylhydroquinone | 18% |
| | and about 48% of | |
| | (1) CnPPeB | 33% |
| | (2) CnPHepB | 50% |
| | (3) bis(4-pentylbenzoyl)-2-methylhydroquinone | 16.6% |

12. A temperature sensor, comprising liquid crystal means for scattering or transmitting light incident thereon as a function of temperature of said liquid crystal means, and containment means for containing plural forms of said liquid crystal means, said containment means comprising a material that undergoes no or slow discoloring in response to relatively high temperature and that does not dissolve said liquid crystal means at relatively high temperatures.

13. The invention of claim 12, said containment means comprising a mixture of at least one polyvinyl alcohol and at least one poly(methylvinyl ether/maleic anhydride).

14. The invention of claim 13, wherein said mixture further comprises a solvent.

15. The invention of claim 14, said solvent comprising at least one selected from the group comprising chloroform, dimethylglycol ether, and diethylglycol ether.

16. The invention of claim 12, said liquid crystal means comprising nematic smectic liquid crystal material.

17. The invention of claim 12, said liquid crystal means comprising operationally nematic or operationally smectic liquid crystal material.

18. The invention of claim 12, wherein said containment means comprises a combination of at least two materials, at least one of said materials ordinarily being water soluble, and at least another of said materials being reactive with said one material to make said containment means water insoluble.

19. A temperature sensor, comprising liquid crystal means for scattering or transmitting light incident thereon as a function of temperature of said liquid crystal means, and containment means for containing plural volumes of said liquid crystal means, said liquid crystal means comprising at least one of nematic liquid crystal material and smectic liquid crystal material in the absence of a cholesteric liquid crystal material admixed therewith.

20. The invention of claim 19, further comprising support means for supporting said volumes of liquid crystal means in said containment means for sensing temperature, said liquid crystal means having a mesomorphic or anisotropic phase at temperatures below a transition temperature and an isotropic phase at temperatures at and above such transition temperature, and said containment means comprising means for distorting the natural structure of said liquid crystal means to distorted, curvilinearly aligned structure when said liquid crystal means is in such mesomorphic or anisotropic phase.

21. The invention of claim 19, said liquid crystal means comprising a mixture of at least two liquid crystal material ingredients, one of said liquid crystal material ingredients having a relatively high transition temperature and the other having a relatively lower transition temperature, the transition temperature of said mixture of said liquid crystal materials being a function of the properties of each of said liquid crystal material ingredients in said mixture.

22. The invention of claim 21, wherein liquid crystal means has a transition temperature of a magnitude that is below room ambient temperature.

23. The invention of claim 1, said containment means comprising Carbopole.

24. The invention of claim 1, said containment means being insoluble in water.

25. The invention of claim 24, said liquid crystal means being insoluble in said containment means.

26. A temperature sensor, comprising liquid crystal means for scattering or transmitting light incident thereon as a function of temperature of said liquid crystal means, and containment means for containing plural volumes of said liquid crystal means, said liquid crystal means comprising operationally nematic liquid crystal material in the absence of a cholesteric liquid crystal material admixed therewith.

27. The invention of claim 26, said liquid crystal means having a mesomorphic or anisotropic phase at temperatures below a transition temperature and an isotropic phase at temperatures at and above such transition temperature.

28. The invention of claim 26, said containment means comprising a material that undergoes no or slow discoloring in response to relatively high temperature and that does not dissolve said liquid crystal means at relatively high temperature.

29. A method of making a liquid crystal apparatus, comprising mixing a first containment medium material with a liquid crystal material to form a plurality of volumes of liquid crystal material in such first containment medium, and mixing with such first-mentioned mixture a second containment medium material reactive with said first containment medium material to complete a containment medium for such liquid crystal material.

30. The method of claim 29, further comprising selecting said first and second containment medium materials such that they are reactive to form substantially water insoluble containment medium for said volumes of liquid crystal material.

31. The method of claim 29, further comprising selecting said first and second containment medium materials to be reactive to prevent or substantially to prevent browning of said containment medium material or absorption of the liquid crystal material in the presence of temperatures exceeding about 100° C.

* * * * *